(12) United States Patent
Tanabe (10) Patent No.: US 8,838,068 B2
(45) Date of Patent: Sep. 16, 2014

(54) VEHICULAR INFORMATION RECEIVER AND VEHICULAR INFORMATION RECEPTION SYSTEM

(71) Applicant: Denso Corporation, Aichi-Pref. (JP)

(72) Inventor: Yasufumi Tanabe, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/745,043

(22) Filed: Jan. 18, 2013

(65) Prior Publication Data

US 2013/0189949 A1    Jul. 25, 2013

(30) Foreign Application Priority Data

Jan. 25, 2012  (JP) .................................... 2012-13231

(51) Int. Cl.
*H04W 4/26* (2009.01)
*H04L 12/14* (2006.01)
*H04M 15/00* (2006.01)

(52) U.S. Cl.
CPC ............ *H04W 4/26* (2013.01); *H04M 15/8257* (2013.01); *H04L 12/1421* (2013.01)
USPC .......................................... 455/407; 379/130

(58) Field of Classification Search
USPC .................................... 455/407; 379/130, 140
See application file for complete search history.

(56) References Cited

U.S. PATENT DOCUMENTS

2004/0059693 A1 * 3/2004 Hausen et al. ................ 705/418

FOREIGN PATENT DOCUMENTS

JP       A-2011-186952     9/2011

* cited by examiner

*Primary Examiner* — Sam Bhattacharya
(74) *Attorney, Agent, or Firm* — Posz Law Group, PLC (57) ABSTRACT

A vehicular information receiver is coupled to a portable device that receives information by paying a communication fee based on a unit packet fee. The receiver sets reception factors that affect the amount of data received by the portable device. An expected fee calculation unit calculates an expected communication fee based on the unit packet fee and an expected amount of data, which is based on the reception factors. A display unit displays the reception factors and the expected communication fee, which can be viewed by a user. Accordingly, the user is able to view the reception factors that determine the amount of data to be received and the expected communication fee associated with the data to be received, before such data is received from the portable device, thereby avoiding unexpected increases in communication fees.

7 Claims, 4 Drawing Sheets

VEHICULAR INFORMATION RECEIVER AND VEHICULAR INFORMATION RECEPTION SYSTEM

CROSS REFERENCE TO RELATED APPLICATION

The present application is based on and claims the benefit of priority of Japanese Patent Application No. 2012-13231, filed on Jan. 25, 2012, which is incorporated herein by reference.

TECHNICAL FIELD

The present disclosure generally relates to a vehicular information receiver and a vehicular information reception system for receiving information from an external source via wireless communication.

BACKGROUND

An information receiving device that receives information via wireless communication external of a vehicle may be a device that is in communication with a server. For example, in Japanese Patent Laid-Open No. 2011-186952 (JP '952), a cellular phone is provided as an information receiving device that is in communication with a server. Further, JP '952 discloses that a reception frequency for receiving data may be set by a user, and a low reception frequency is set to reduce communication fee.

Setting a reception frequency restricts the amount of data received, and, therefore, may reduce the communication fee to a certain degree. However, even when the reception frequency is set, the communication fee may increase if the amount of data received at one time is large. On the other hand, if the amount of data received at one time is small, the communication fee falls to a lower level which may be lower than expected. In such a case, the user may possibly think that the amount of data downloaded should not have been restricted by the low reception frequency setting.

SUMMARY

In an aspect of the present disclosure, a vehicular information receiver may be coupled to a portable device that performs wireless communication with an external server to receive information. The portable device receives the information in the form of data by paying a communication fee determined by a unit packet fee, which is defined as a fee per unit amount of data. The vehicular information receiver includes a reception factor set unit, an expected fee calculation unit, a display unit, and a reception process unit.

The reception factor set unit sets a reception factor according to an input operation of a user. The reception factor may include multiple factors that affect the amount of data received by the portable device. The expected fee calculation unit calculates an expected communication fee based on the unit packet fee and an expected amount of data. The expected amount of data is based on the reception factor set by the reception factor set unit;

The display unit displays the reception factor set by the reception factor set unit and the expected communication fee calculated by the expected fee calculation unit, which is viewed by the user. The reception process unit controls the portable device to receive the information in the form of data, and control the display unit to display the information received from the portable device. Accordingly, by displaying the reception factor, which affects the amount of data received by the portable device, and the expected communication fee, the vehicular information receiver allows the user to review the settings and the fee before the data is actually downloaded. Therefore, an unexpected increase in communication fees is prevented and the amount of data received is not unnecessarily limited to a smaller value.

Further, a vehicular information reception system is disclosed as including the portable device and an in-vehicle apparatus. The in-vehicle apparatus is disposed in a vehicle and performs short range wireless communication with the portable device, which is brought into the vehicle. Further, the in-vehicle apparatus includes the reception factor set unit, the expected fee calculation unit, the display unit, and the reception process unit, which are described above. The reception process unit of the in-vehicle apparatus acquires the information from the portable device via the short range wireless communication, and then controls the display unit to display the information acquired from the portable device.

Accordingly, the vehicular information reception system also allows the user to review the settings and the fee before the data is actually downloaded. Therefore, an unexpected increase in communication fees is prevented and the amount of data received is not unnecessarily limited to a smaller value.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

First Embodiment

Figure 1:
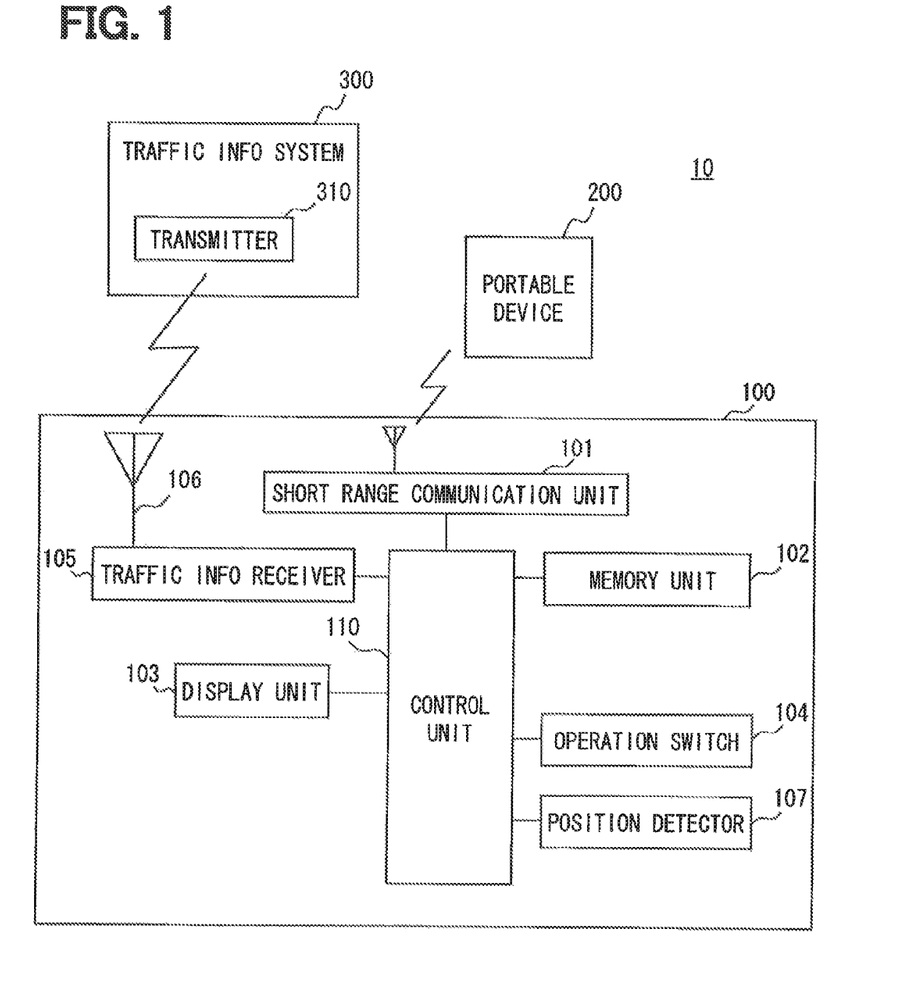
FIG. 1 is a block diagram of a traffic information reception system of the present disclosure.

An embodiment of the present disclosure is described with reference to the drawings. FIG. 1 illustrates the first embodiment of a vehicular information reception system, described as a traffic information reception system 10. The traffic information reception system 10 includes an in-vehicle apparatus 100 and a portable device 200.

The portable device 200 has a wide area wireless communication function, and performs data communication with a server based on a contract with a wide area wireless communication carrier, which charges a fee for communication. For example, a cellular phone having a data communication function may be used as the portable device 200. The portable device 200 can receive traffic information by using the wide area wireless communication function.

Further, the portable device 200 receives traffic information by executing an application program that is used primarily for receiving traffic information (i.e., a traffic information application, hereinafter), which is stored in the device 200. The traffic information application includes a function that sets a traffic information reception area, a reception information type, and a reception frequency.

In order for the portable device 200 to receive data, a use fee may be required. The use fee or communication fee may be based on a contract between the user and the communication carrier, and can be determined various ways. For instance, the use fee may be charged by an un-metered plan (i.e., unlimited plan) that charges a fixed fee for data communication for one month, regardless of the amount of data received. In the un-metered plan, the ability to receive data is charged, but the amount of data received is not charged.

Another type of use fee for receiving data may be a metered plan, in which the use fee is charged by the amount of data received, or a semi-metered plan, in which the use fee is charged as a constant fee up to a certain threshold amount of data with the excess from the threshold charged by the amount. Further, the use fee may also be charged by a step-meter plan, in which the use fee is based on step-wise reception threshold amounts, excess of which leading to a higher use fee.

The above-described plans are just examples, and the use fee is determined based on the individual contract between the user and the communication carrier. The amount of data is measured by a unit of packet. Thus, the content of the contract is referred to as the packet contract, and may be stored in a memory of the portable device 200. Alternatively, the packet contract may be acquired from a server via a request from the in-vehicle apparatus 100.

The portable device 200 has a built-in short range wireless communication device. For example, the short range wireless communication device may be a device performing short range wireless communication according to a Bluetooth (a registered trademark) standard. In the present embodiment, the portable device 200 is brought into the vehicle when it is used.

The in-vehicle apparatus 100 includes a short range communication unit 101, a memory unit 102, a display unit 103, an operation switch 104, a traffic information receiver 105, a position detector 107, and a control unit 110.

The short range communication unit 101 has a communication function based on, for example, the Bluetooth standard, and performs wireless communication with the portable device 200.

The memory unit 102 stores various kinds of data. The memory unit 102 stores a reception packet table for each of the reception areas. Details of the reception packet table are described later. Further, the memory unit 102 also stores map data.

The display unit 103 displays various kinds of information, which may be viewed by the occupants of the vehicle. The operation switch 104 is operated by the occupant of the vehicle for specifying reception settings of the traffic information.

The traffic information receiver 105 is a receiver for receiving traffic information by an in-vehicle antenna 106 from a transmitter 310 of a traffic information system 300. The traffic information system, such as a VICS system (a registered trademark), transmits the traffic information, which can be received for free.

The transmission facilities of the traffic information system may be an FM multiplex broadcasting system, a light beacon installed over a road, an electric wave beacon, or the like. The coverage of these facilities is narrower in comparison to the coverage of the wide area wireless communication provided by the communication carrier. Therefore, there may be a situation in which the portable device 200 can receive traffic information while the traffic information receiver 105 cannot.

Further, the traffic information received by the traffic information receiver 105 may be charged information, charged for the reception of such information.

The position detector 107 may be provided as a Global Positioning System (GPS) receiver detecting a position of an own vehicle based on the electric wave from a satellite.

The control unit 110 is connected to the short range communication unit 101, the memory unit 102, the display unit 103, the operation switch 104, the traffic information receiver 105, and the position detector 107. The control unit 110 may include a ROM, a RAM, and a CPU. The control unit 110 performs various kinds of functions based on the execution of a program stored in the ROM and executed by the CPU with the temporary storage function of the RAM.

Figure 2:
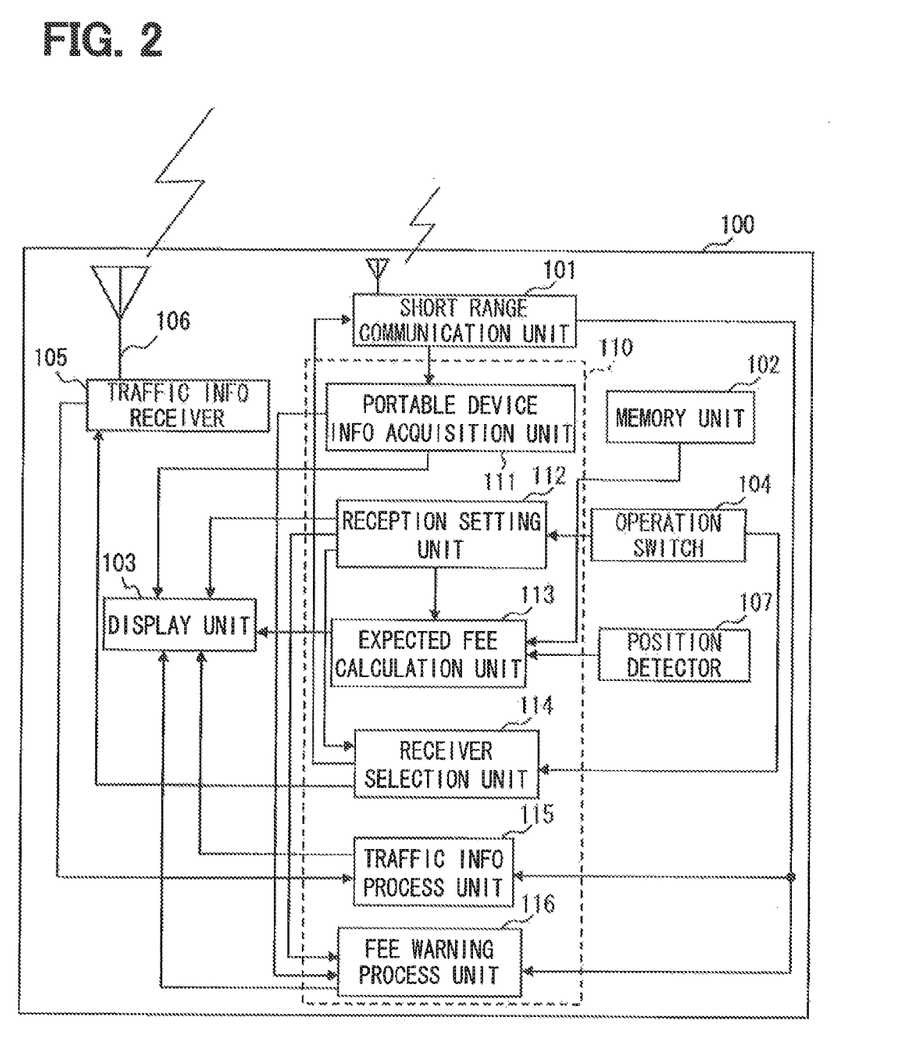
FIG. 2 is a block diagram of a control unit of an in-vehicle apparatus of the traffic information reception system.

FIG. 2 is a block diagram of the functions that are performed by the control unit 110 and represented as units. The control unit 110 has a portable device information acquisition unit 111, a reception setting unit 112, an expected fee calculation unit 113, a receiver selection unit 114, a traffic information process unit 115, and a fee warning process unit 116.

The portable device information acquisition unit 111 acquires information from the portable device 200 (i.e., portable device information hereinafter) through the short range communication unit 101. The portable device information includes an operating state of the traffic information application and packet information.

The packet information includes the packet contract, the accumulated fee of packet communication, and a unit packet fee. The packet contract is provides a fee plan of the use fee. The accumulated fee of packet communication is a packet communication fee accumulated up to the current moment, and may be provided in the currency of the country in which the traffic information reception system 10 is used. In addition, an accumulation period is set according to the setting of the portable device 200. For example, the accumulation period may be a period from a start of use of the portable device 200 to a current time. The accumulation period may be the same period as a period of fee payment. The unit packet fee is a communication fee per a unit amount of data, and may be understood as a relationship between an amount of data and a communication fee.

Further, the portable device information acquisition unit 111 displays the portable device information on the display unit 103 after acquiring the information from the portable device 200. The portable device 200 refers to the packet contract, the accumulated amount of packet communication, and the unit packet fee that are either stored in the memory of the portable device 200 or acquired from the sever of the communication carrier on demand (i.e., by request) by the in-vehicle apparatus 100.

The reception setting unit 112 sets various kinds of settings for receiving traffic information via the portable device 200. Setting items may include a maximum reception fee, a reception frequency, a reception range, and a reception information type. The reception setting unit 112 may be provided as a reception factor set unit and a maximum fee set unit in claims.

Further, the reception setting unit 112 displays the setting items on the display unit 103. While confirming each of the setting items displayed on the display unit 103, the user can change the values of the setting items via an input operation of the operation switch 104. The setting items may be displayed and changed at any time.

The maximum reception fee may be provided in the currency of the country in which the traffic information reception system 10 is used. The reception frequency indicates the number of receptions per unit time (e.g., number of packets per unit time). The reception range for gathering the traffic information is set as a multi-step range around a reference position. For example, it may be set from among five steps of 10 km, 50 km, 100 km, 200 km, and 300 km from the reference position. When no specific instruction has been given from the user, the reference position is basically the current position. The user may specify the reference position as any point on the road map when the road map is displayed on the display unit 103 based on the data stored in the memory unit 102.

The reception information type specifies the type of information received as the traffic information, such as traffic jam information, road-closed information, and accident information. The user may specify the traffic information as one or more types of information to be received by the traffic information reception system 10.

The expected fee calculation unit 113 calculates a per-unit-time expected packet communication fee (i.e., expected packet communication fee hereinafter) for current time period (i.e., at this moment) and for a subsequent time, according to the setting set by the reception setting unit 112. The calculation of the expected packet communication fee may be based on the reception packet table stored in the memory unit 102. The time period for which the expected packet communication fee is calculated is set in advance.

The reception packet table is provided for each of the reception areas and has specific settings for each of the reception information types. Each of the reception packet tables defines an amount of data acquired by one communication session in a specific time slot, or, in other words, the number of packets received in one communication session. The reception areas of the reception packet table are defined based on the amount of data received in one communication session. Therefore, an urban area and a rural area are usually defined as different areas because there is usually more traffic information (i.e., more data) for the urban area than for rural area.

Also, the amount of data received in one communication session is provided as an average value for one time slot. In other words, the time slot is given a uniform value representing the amount of data received in a communication session that occurs within the time slot. Therefore, rush hour and non-rush hour are usually defined as different time slots because there is usually more traffic information (i.e., more data) during rush hour, due to for example, traffic jams and accidents, than during non-rush hour.

The information provided in the reception packet table takes into consideration that the amount of traffic information is greatly affected by an area, a time slot, and an information type, with other factors causing a nominal change. The reception packet table is set in advance before the shipment of the system 10 based on the amount of traffic information of various areas.

Based on the number of packets received in one communication session and the unit packet fee defined in the reception packet table and the reception frequency, the per-unit-time expected packet communication fee is calculated as a product of those numbers for each of reception packet tables. The number of reception packet tables used for calculation is determined according to the reception range and the reception information type that are set by the reception setting unit 112. From among multiple tables set for various areas, the tables of the areas that are covered at least partially by the reception range, which is set by the reception setting unit 112, are used for the calculation of the per-unit-time packet communication fee.

The expected fee calculation unit 113 displays the expected packet communication fee for the current time period and the subsequent time on the display unit 103.

Based on the reception state of the traffic information by the traffic information receiver 105 and whether there is an input operation of the user via the operation switch 104, the receiver selection unit 114 determines whether to select (i.e., use) the traffic information receiver 105 or the portable device 200. When the traffic information receiver 105 is selected, the traffic information receiver 105 is controlled for receiving the traffic information. On the other hand, when the portable device 200 is selected, a request signal for requesting the traffic information is transmitted from the short range communication unit 101 to the portable device 200. The request signal includes the reception range, the reception information type, and the reception frequency. If the request signal only includes the reception range and the reception information type and not the reception frequency, the request signal may be transmitted at an interval determined by the reception frequency.

Based on the traffic information received from either the traffic information receiver 105 or the portable device 200 via the short range communication unit 101, the traffic information process unit 115 performs a predetermined traffic information process to display the traffic information received on the display unit 103. The traffic information process unit 115 may be provided as a reception process unit in claims.

The fee warning process unit 116 counts the number of packets that are received by the portable device 200 to calculate an actual packet communication fee. The actual packet communication fee is the communication fee associated with the reception of the traffic information by the portable device 200 and is based on the number of packets and the unit packet fee acquired by the portable device information acquisition unit 111. The actual packet communication fee may be referred to as actual communication fee in the claims.

The actual packet communication fee is then compared to the difference between (i) the accumulated packet communication fee accumulated so far and (ii) the maximum reception fee set by the reception setting unit 112 to determine whether the maximum reception fee has been exceeded by the reception of the traffic information. When the maximum reception fee has been exceeded, a warning message is displayed on the display unit 103 to inform the user that the maximum reception fee has already been exceeded. Further, a confirmation message is displayed to confirm with the user that the portable device 200 will continued to be used for receiving the traffic information. When the user sees the warning message and the confirmation message, the user can then change the maximum reception fee or can change the receiver (i.e., can switch receivers) for receiving the traffic information.

Figure 3:
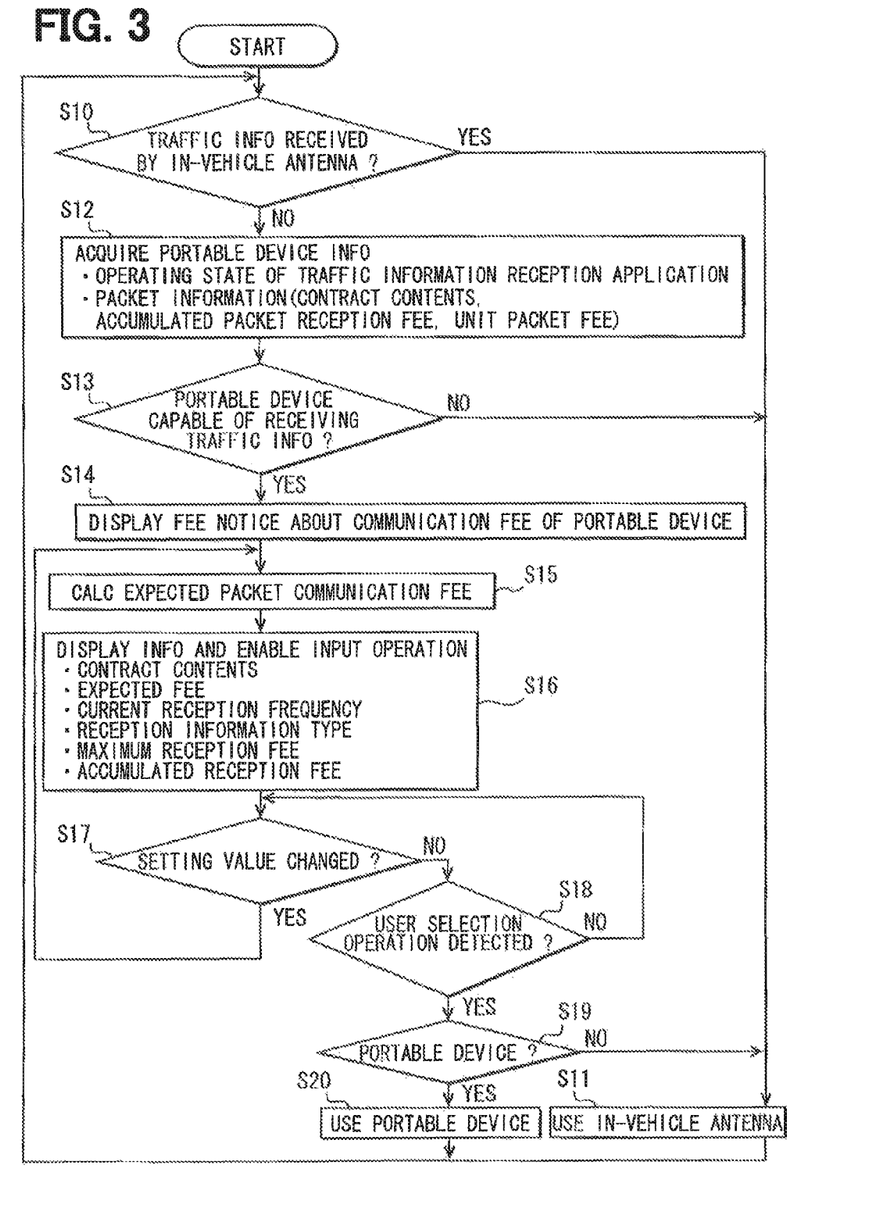
FIG. 3 is a flowchart of a receiver selection process in a first embodiment of the present disclosure.

With reference to FIG. 3, the control unit 110 performs a process to select a receiver when the control unit 110 is in an operating state.

At S10, the control unit 110 determines whether the traffic information receiver 105 has received the traffic information through the in-vehicle antenna 106. When the traffic information has been received through the in-vehicle antenna 106 (S110: Yes), the control unit proceeds to S11. In S11, the control unit 110 determines that the in-vehicle antenna 106 is to be used for receiving the traffic information, and then returns to S10.

When the traffic information has not yet been received by the in-vehicle antenna 106 (S10: No), the control unit 110 acquires the portable device information from the portable device 200 at S12. The portable device information includes the packet information and the operating state of the traffic information application. The packet information has the packet contract, the accumulated packet reception fee, and the unit packet fee.

In S13, the control unit 110 determines whether the portable device 200 is capable of receiving the traffic information. Specifically, based on the operating state of the traffic information application provided in the portable device information acquired in S12, if the traffic information application has been started, then the portable device 200 may receive the traffic information (S13: Yes) and the control unit 110 proceeds to S14. If the traffic information application has not been started, then the portable device 200 can not receive the traffic information (S13: No) and the control unit 110 determines that the in-vehicle antenna 106 is to be used for receiving the traffic information at S11.

In S14, when the packet contract acquired in S12 indicates that the communication fee is variable according to the amount of data received, a notice regarding a fee associated with the use of the portable device 200 is displayed on the display unit 103. In other words, when a fee plan according to the contract is other than the un-metered plan, such notice is displayed.

The control unit 110, at S15, calculates an expected packet communication fee, which is performed by the expected fee calculation unit 113. The expected packet communication fee is calculated based on the current setting of the reception range, the reception information type, the reception frequency, as well as the unit packet fee received at S12, the current time of day, and the reference position.

In S16, the control unit 110 displays various kinds of information on the display unit 103. The displayed information includes the packet contract, the expected packet communication fee, the reception frequency, the reception range, the reception information type, the maximum reception fee, and the accumulated reception fee. In addition to the information, an input operation from the user is enabled to allow the user to change the value of the setting items by operating the operation switch 104. For example, the user may change the settings of the reception frequency, the reception range, the reception information type, and the maximum reception fee.

At S17, the control unit 110 determines whether any of the setting items has been changed by the user via the operation switch 104. If at least one setting unit has been changed (S17: YES), the control unit 110 returns to S15, to re-calculate the expected packet communication fee by using the new settings, and then performs S16 again. In such manner, the user can determine the value of the setting items while confirming what value of which setting item changes the expected packet communication fee based on the displayed values on the display unit 103.

If none of the setting items have been changed by the user after a certain period of time (S17: No), the control unit 110 then determines, at S18, whether the user has performed an operation for selecting the receiver for receiving the traffic information. Specifically, a use confirmation button for confirming the use of the portable device 200 and a non-use confirmation button for confirming non-use of the portable device 200 are provided on the display unit 103. If one of the two buttons is selected then, the user has selected the receiver for receiving the traffic information (S18: Yes), and the control unit continues to S19. If neither of the buttons is selected (S18: No), the control unit 110 returns to S17.

In S19, the control unit 110 determines whether the user selected the use confirmation button for confirming use of the portable device 200. If the user did not select the use confirmation button (S19:No), the control unit 110, at S11, determines to use the in-vehicle antenna and then returns to S10. If the user selected the use confirmation button (S19:Yes), the control unit 110, at S20, determines that the portable device 200 will be used, and then returns to S10.

According to the first embodiment described above, based on the calculation of the expected packet communication fee (S15), the calculated value of the expected packet communication fee is displayed (S16). Therefore, the communication fee is prevented from rising to an unexpected level without the user's confirmation.

Further, along with the expected packet communication fee, the reception factors affecting the amount of data received, such as the reception frequency, the reception range, and the reception information type are also displayed. Therefore, a situation where the amount of data received is smaller than expected is prevented.

The preference of the traffic information may vary depending on the user or depending on the time of day. For instance, how frequently the user would like to receive the traffic information, how wide or broad the user would like to set the reception range, and what type of traffic information the user would like to receive may vary. In addition, changes to the reception frequency, the reception range, or the reception information type may affect the communication fee because such change affects the amount of data to be transmitted. Since, the reception frequency, the reception range, and the reception information type, may be set by the user, the user can know and confirm in advance the expected packet communication fee resulting from the changed setting (i.e., various settings).

Further, in the first embodiment, the user can set the maximum reception fee, and if the expect packet communication fee exceeds the maximum reception fee and a warning message will be displayed on the display unit 103 by the fee warning process unit 116. Upon seeing the display of such warning message, the user can determine if he/she should continue to use the portable device 200 for receiving traffic information.

Second Embodiment

The second embodiment of the present disclosure is described in the following.

The traffic information system in the second embodiment is different from the system in the first embodiment for a portion of the process that is performed by the control unit 110 of the in-vehicle apparatus 100. Other mechanical configurations are same as the first embodiment.

Figure 4:
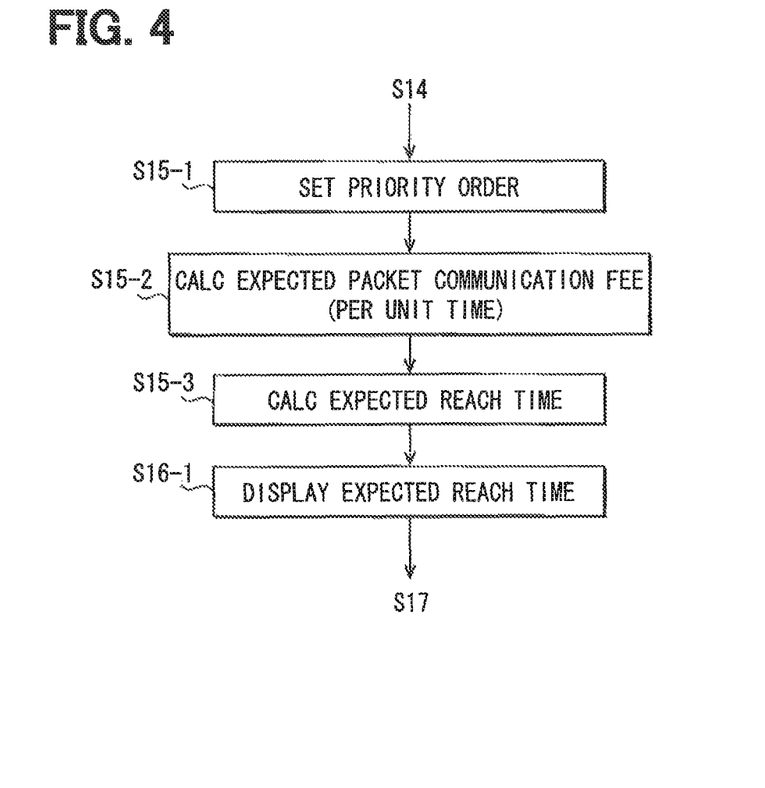
FIG. 4 is a flowchart of a portion of the receiver selection process in a second embodiment of the present disclosure.

In the second embodiment, S15 and S16 of FIG. 3 of the first embodiment are replaced with a receiver selection process of FIG. 4, which is performed by the control unit 110.

In the second embodiment, after the display of the notice at S14 of FIG. 3, the control unit 110, at S15-1, divides the reception range set at that moment (i.e., a current reception range) according to a preset division of sub-ranges, and sets a priority order to each of the resulting sections defined by the sub-ranges and the reception information types. S15-1 may be referred to as a priority order set unit in claims.

Figure 5:
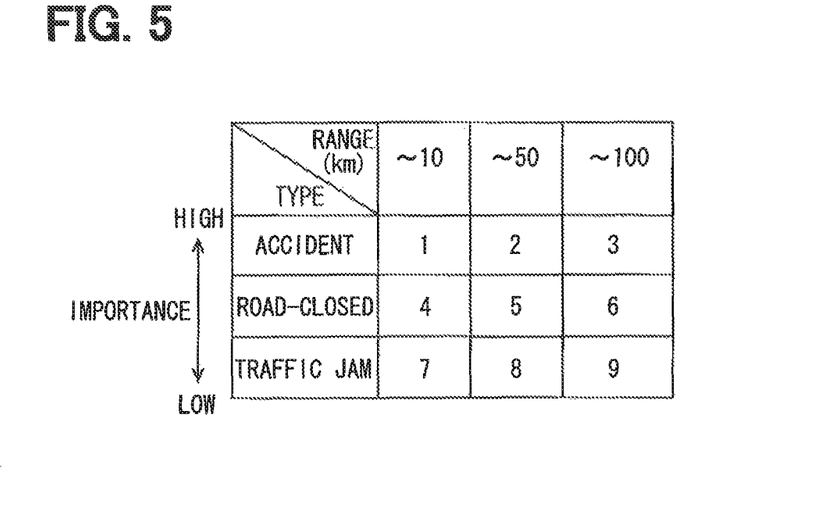
FIG. 5 is an illustration of priority setting of the second embodiment.

With reference to FIG. 5, an example of the priority order setting shows a reception range of 100 km divided into three preset sub-ranges of under 10 km, under 50 km, and under 100 km. By combining three sub-ranges with the three reception information types, nine sections are defined as a result. Each of the sections has its priority order designated as a number (e.g., "1" being highest priority and "9" being lowest priority) and none of the sections have the same number. For example, a road closure within a reception range of less than 10 km has a priority order of 4. The priority order of each section is higher toward the center of the reception range (i.e., the position of the vehicle), and is higher for the important reception information types, as shown in FIG. 5. Therefore, for example, the reception range of under 10 km has a higher priority order than the reception range of under 50 km, and information regarding accidents have a higher priority than information regarding road-closures.

At S15-2, the control unit 110 calculates the per-unit-time expected packet communication fee for each of the sections, in order of priority, which was set at S15-1, S15-2 may be referred to as an expected fee calculation unit in claims.

The calculation method for calculating the expected packet communication fee is same as the first embodiment. By adding the expected packet communication fee for each section according to the priority order, a total fee within range of the maximum reception fee is presented as a final per-unit-time expected packet communication fee.

At S16-3, the control unit 110 calculates an expected maximum fee reach time based on the per-unit-time expected packet communication fee calculated at S15-2, a communication fee at the moment (i.e., a current communication fee for the current time), and a current margin for the maximum fee. The expected maximum fee reach time is the time at which the communication fee reaches the maximum reception fee. The current communication fee may be calculated by the control unit 110 or may be acquired from the portable device 200, S15-3 may be referred to as a reach time estimation unit in claims.

At S16-1, the control unit 110 displays, on the display unit 103, the expected maximum fee reach time calculated at S15-3. Besides the expected maximum fee reach time, the display unit 103 displays various information in the same manner as S16 of the first embodiment. Further, just like S16, the control unit 110, at S16-1, displays and enables an input operation to allow the user to change the setting items.

According to the second embodiment, since the expected maximum fee reach time is displayed on the display unit 103, the user is informed of when the communication fee reaches the maximum reception fee. Further, the user may change the setting items (i.e., the reception frequency, the reception range, and the reception information type) to delay the expected maximum fee reach time or expedite the expected maximum fee reach time, if the user feels that the time to reach the maximum reception fee is too short or too long.

Further, in the second embodiment, the priority setting is performed based on the sections defined by the sub-ranges and the reception information types. By calculating the expected packet communication fee per unit time for each of the sub-sections in the order of priority and by adding the per-unit-time expected packet communication fee for each of the sub-sections, the final per-unit-time expected packet communication fee is calculated as the maximum total fee within the range of the maximum reception fee. Therefore, an excessive packet communication fee exceeding the maximum reception fee caused by the reception of the traffic information is prevented.

Further, by setting the sub-ranges, a priority order of each section is set based on the sub-range in combination with the reception information type. Therefore, highly useful traffic information that has is most highest possible usefulness within the range of the maximum reception fee can be received. In other words, important traffic information can be purchased within the budget of the user (i.e., within the maximum reception fee).

Although the present disclosure has been fully described in connection with the preferred embodiment thereof with reference to the accompanying drawings, it is to be noted that various changes and modifications will become apparent to those skilled in the art.

For instance, instead of receiving traffic information, other type of information may be received, such as news, by using the same reception method. Further, radio programs may also be received by the same reception method.

The process performed by the control unit 110 of the in-vehicle apparatus 100 may be partially or may be entirely performed by the control unit of the portable device 200. When the process is entirely performed by the control unit of the portable device 200, the portable device 200 itself serves as the vehicular information receiver.

Further, when the in-vehicle apparatus 100 includes a communication unit that is capable of transmitting the information to an external server outside of a vehicle, the process performed by the control unit 110 may be performed by such server, with the required information input and transmitted from the control unit 110 to the server.

Such changes and modifications are to be understood as being within the scope of the present disclosure as defined by the appended claims.

What is claimed is:

1. A vehicular information receiver coupled to a portable device that performs wireless communication with an external server to receive an information, the portable device receives the information in the form of data by paying a communication fee determined by a unit packet fee, the unit packet fee defines a fee per unit amount of data, the vehicular information receiver comprising:

a reception factor set unit setting a reception factor according to an input operation of a user, wherein the reception factor affects an amount of data received by the portable device;

an expected fee calculation unit calculating an expected communication fee based on the unit packet fee and an expected amount of data, wherein the expected amount of data is based on the reception factor set by the reception factor set unit;

a display unit displaying the reception factor set by the reception factor set unit and the expected communication fee calculated by the expected fee calculation unit; and a reception process unit controlling the portable device to receive the information and controlling the display unit to display the information received from the portable device.

2. The vehicular information receiver of claim 1, wherein the information received by the portable device is traffic information, and the reception factor set unit sets as the reception factor at least one of a reception frequency, a reception range, and a reception information type of the traffic information.

3. The vehicular information receiver of claim 2 further comprising:

a maximum fee set unit setting a maximum of the communication fee, as a maximum fee; and a priority order set unit generating multiple range sections by diving the reception range set by the reception factor set unit according to multiple preset division ranges and the reception information type, and setting a priority order for each of the range sections, the priority order being set higher toward a center of the reception range and being higher for reception information type having higher importance, wherein the reception factor set unit sets the reception range of the traffic information as the reception factor, the expected fee calculation unit calculates the expected communication fee for each of the range sections according to the priority order set for the range section, and sets a final communication fee by adding the expected communication fees calculated, the final communication fee restricted to be within the maximum fee, and the reception process unit receives the traffic information from the range section that is included in the preset division range and the reception information type corresponding to the final communication fee.

4. The vehicular information receiver of claim 1 further comprising:

a maximum fee set unit setting a maximum of the communication fee, as a maximum fee; and a reach time estimation unit estimating an expected maximum fee reach time as a time when the communication fee reaches the maximum fee, the expected maximum fee reach time being based on the expected amount of data, the unit packet fee, and a current communication fee, wherein the display unit displays the expected maximum fee reach time.

5. The vehicular information receiver of claim 1 further comprising:

a maximum fee set unit setting a maximum of the communication fee, as a maximum fee; and a fee warning process unit generating a warning to be displayed by the display unit, wherein the warning is generated when the maximum fee is exceeded by an actual communication fee and the actual communication fee is calculated based on the amount of data received by the portable device and the unit packet fee.

6. A vehicular information reception system comprising:

a portable device performing wireless communication with a server for receiving an information in the form of data by paying a communication fee determined by a unit packet fee; and an in-vehicle apparatus disposed in a vehicle and performs short range wireless communication with the portable device existing in the vehicle, the in-vehicle apparatus including:

a reception factor set unit setting a reception factor according to an input operation of a user, the reception factor changing an amount of data received by the portable device, an expected fee calculation unit calculating an expected communication fee based on the unit packet fee and an expected amount of data, wherein the expected amount of data is based on the reception factor set by the reception factor set unit, a display unit displaying the reception factor set by the reception factor set unit and the expected communication fee calculated by the expected fee calculation unit, and a reception process unit controlling the portable device to receive the information, acquiring the information from the portable device via the short range wireless communication, and controlling the display unit to display the information acquired from the portable device.

7. The vehicular information reception system of claim 6 further comprising:

a traffic information system having a transmitter to transmit traffic information, wherein the portable device receives traffic information from the server, the in-vehicle apparatus further includes a receiver that receives the traffic information from the traffic information system and a receiver selection unit that selects either the receiver or the portable device based on an operation from the user for providing the traffic information, and the reception process unit acquires the traffic information from either the receiver or the portable device based on the operation from the user and controls the display unit to display the traffic information.

* * * * *